US008672367B2

(12) United States Patent
Jacklich et al.

(10) Patent No.: US 8,672,367 B2
(45) Date of Patent: Mar. 18, 2014

(54) EXHAUST SYSTEM INTERLOCKING MECHANISM

(75) Inventors: John R. Jacklich, Napa, CA (US); Eric Adair, Dixon, CA (US); Steven L. McIntyre, Elk Grove, CA (US)

(73) Assignee: M&G Duravent, Inc., Vacaville, CA (US)

( * ) Notice: Subject to any disclaimer, the term of this patent is extended or adjusted under 35 U.S.C. 154(b) by 1013 days.

(21) Appl. No.: 11/743,290

(22) Filed: May 2, 2007

(65) Prior Publication Data

US 2007/0257487 A1 Nov. 8, 2007

Related U.S. Application Data

(60) Provisional application No. 60/797,191, filed on May 2, 2006.

(51) Int. Cl.
*F16L 37/248* (2006.01)

(52) U.S. Cl.
USPC .............................. 285/402; 285/401; 285/396

(58) Field of Classification Search
USPC .................... 285/123.1, 123.3, 123.5, 123.15, 285/123.16, 124.1, 124.2, 133.3, 361, 396, 285/401–402, 360
See application file for complete search history.

(56) References Cited

U.S. PATENT DOCUMENTS

| 63,797 | A |   | 4/1867 | Hurd |
|---|---|---|---|---|
| 177,729 | A | * | 5/1876 | Loring ........................... 285/396 |
| 211,164 | A |   | 1/1879 | Klein |
| 266,017 | A |   | 10/1882 | Cooper |
| 554,666 | A | * | 2/1896 | Feltner ............................ 285/85 |
| 641,846 | A | * | 1/1900 | Davenport et al. ............. 285/87 |
| 796,084 | A | * | 8/1905 | Orr ................................ 285/396 |
| 1,279,935 | A | * | 9/1918 | Sweat ........................... 285/189 |
| 1,476,727 | A |   | 12/1923 | Quigg |
| 2,650,112 | A |   | 8/1953 | Kinkead |
| 2,850,264 | A |   | 9/1958 | Grable |
| 2,851,288 | A |   | 9/1958 | Kinkead |
| 2,936,184 | A |   | 5/1960 | Epstein |
| 3,233,927 | A |   | 2/1966 | Dewhirst |
| 3,272,537 | A |   | 9/1966 | Bellatorre et al. |
| 3,455,580 | A | * | 7/1969 | Howard ........................ 285/87 |
| 3,842,721 | A | * | 10/1974 | Cardiff ........................... 454/44 |
| 3,872,780 | A |   | 3/1975 | Zanias |
| 4,010,728 | A |   | 3/1977 | Hempel et al. |
| 4,140,422 | A | * | 2/1979 | Crumpler et al. .............. 405/49 |
| 4,305,180 | A | * | 12/1981 | Schwartz ...................... 439/296 |

(Continued)

FOREIGN PATENT DOCUMENTS

JP        52062724 A  *  5/1977  .............. F16L 21/04

OTHER PUBLICATIONS

Office Action dated Dec. 28, 2009 in U.S. Appl. No. 11/743,041, filed May 1, 2007.

(Continued)

*Primary Examiner* — James Hewitt

(74) *Attorney, Agent, or Firm* — Vierra Magen Marcus LLP

(57) ABSTRACT

An interlocking mechanism includes an entry channel and a rotational channel positioned adjacent to entry channel. A locking bead is positioned in the rotational channel at a position in the channel defined to engage a mating element in a locking lug on a mating component when the lug is positioned adjacent to an end of the channel. The entry channel may include a face increasing in height from the entry portion to the end portion.

32 Claims, 14 Drawing Sheets

(56) References Cited

U.S. PATENT DOCUMENTS

| | | | |
|---|---|---|---|
| 4,502,370 A | | 3/1985 | Baileys et al. |
| 4,611,662 A | * | 9/1986 | Harrington ................... 166/339 |
| 5,466,020 A | * | 11/1995 | Page et al. ..................... 285/361 |
| 5,651,732 A | | 7/1997 | Dufour |
| 5,741,084 A | * | 4/1998 | Del Rio et al. ................ 403/349 |
| 6,382,680 B1 | * | 5/2002 | Horimoto ....................... 285/81 |
| 6,811,190 B1 | * | 11/2004 | Ray et al. ....................... 285/402 |
| 2005/0023825 A1 | * | 2/2005 | Nakamura et al. .............. 285/81 |

OTHER PUBLICATIONS

Response to Office Action dated Apr. 28, 2010, U.S. Appl. No. 11/743,041, filed May 1, 2007.

Amendment dated Sep. 24, 2010, U.S. Appl. No. 11/743,041, filed May 1, 2007.

Response to Office Action dated Jun. 22, 2011, U.S. Appl. No. 11/743,041, filed May 1, 2007.

Office Action dated Oct. 31, 2011, U.S. Appl. No. 11/743,041, filed May 1, 2007.

Office Action dated Dec. 22, 2010, U.S. Appl. No. 11/743,041, filed May 1, 2007.

Office Action dated Mar. 1, 2012, U.S. Appl. No. 11/743,041, filed May 1, 2007.

Response to Office Action dated Jan. 31, 2012, U.S. Appl. No. 11/743,041.

Amendment dated Sep. 4, 2012, U.S. Appl. No. 11/743,041, filed May 1, 2007.

Notice of Allowance dated Apr. 29, 2013, U.S. Appl. No. 11/743,041, filed May 1, 2007.

* cited by examiner

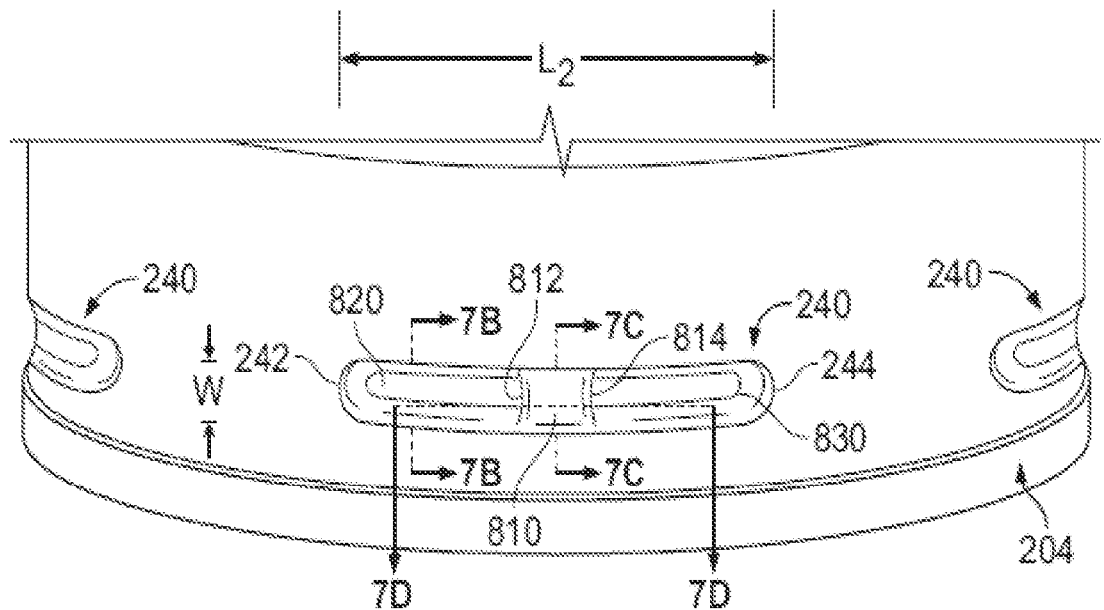
FIG. 7A
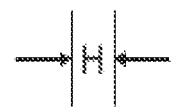
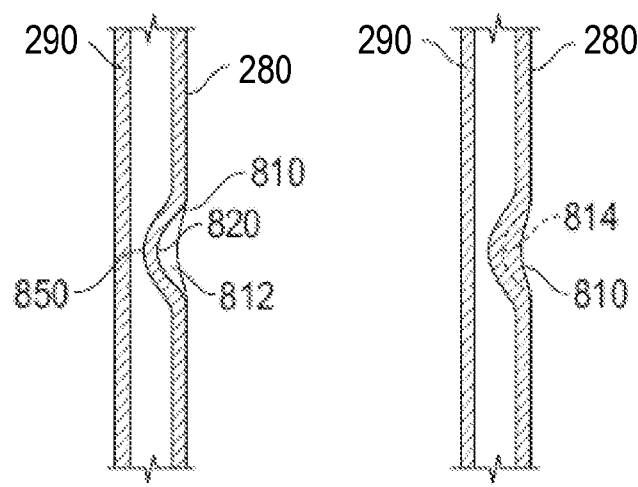
FIG. 7B  FIG. 7C

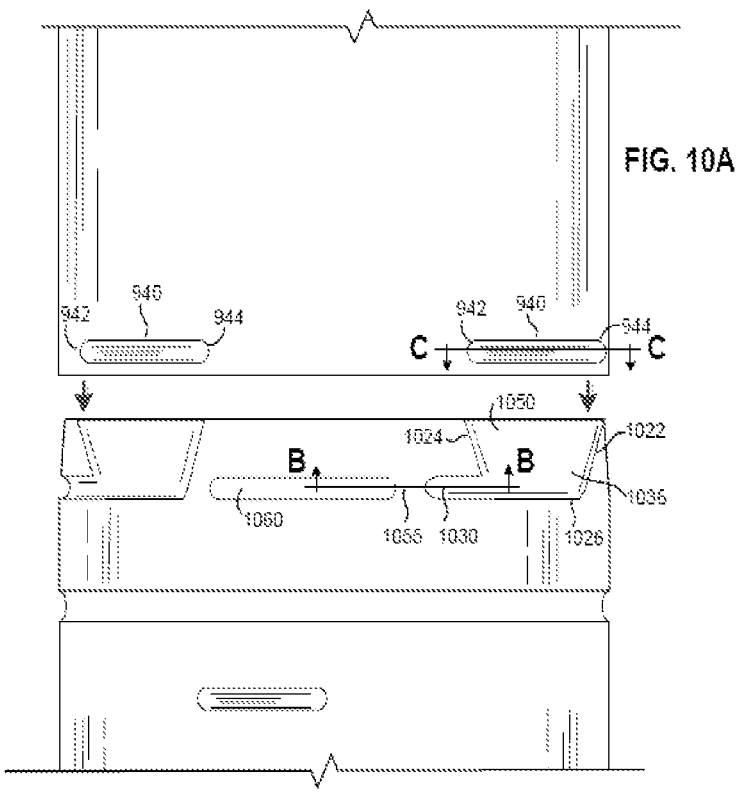
FIG. 10A
FIG. 10B
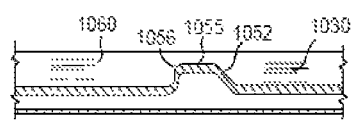
FIG. 10C
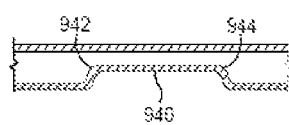

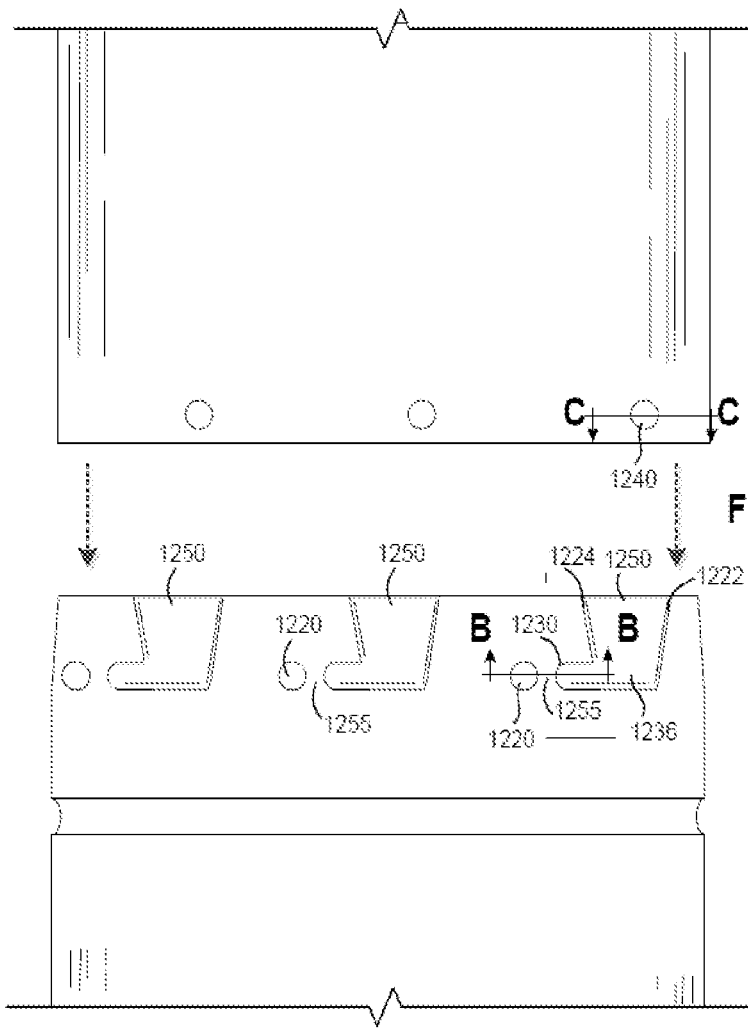
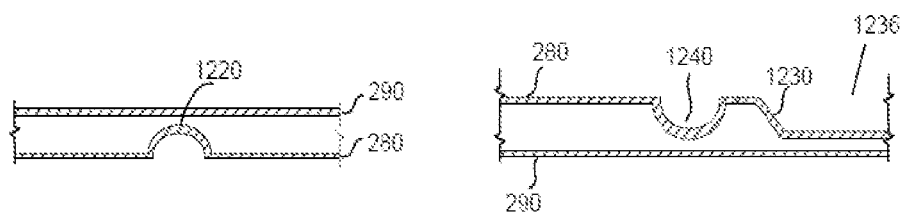
FIG. 12B
FIG. 12C

EXHAUST SYSTEM INTERLOCKING MECHANISM

CLAIM OF PRIORITY

This application claims the benefit of U.S. Provisional Application No. 60/797,191, "Gasket-Less Pellet Chimney Pipe And Exhaust System Interlocking Mechanism," filed on May 2, 2006, inventors Jacklich, et al. which is incorporated herein by reference.

BACKGROUND OF THE TECHNOLOGY

Fuel burning appliances require an exhaust system to conduct combustion products including noxious gasses and water vapor to the exterior of a dwelling. Such appliances can include, for example, furnaces, water heaters, boilers, room heaters, and wood and pellet burning stoves. Single and double wall exhaust products have been developed to meet this need in numerous types and sizes. One particular type of piping is type B gas vent for venting listed natural gas or liquid propane Category I appliances. Other types of vent pipes and chimneys are commonly found in homes and office buildings to vent the products of combustion to the atmosphere.

Vent pipes, fittings and adapters, all exhaust systems generally include one or more usually made from a ductile material, such as sheet metal. These components are assembled in place and installed to custom fit the exhaust system to a given space. Vent pipes are usually located between walls, in attics and in crawl spaces where there is little room to work. As a result, the manipulation of the vent pipes is difficult, particularly with regard to connecting vent pipe sections. The connection between adjoining sections of vent pipe must be secure to avoid venting combustion products to the living space.

Existing twist type couplings exist, as illustrated in U.S. Pat. Nos. 6,811,190 and 796,084. Numerous commercial products use a form of twist coupling. One commercial product using a twist type couple is the TYPE B GAS VENT FAMILY OF PRODUCTS manufactured by Simpson Dura-Vent Company, Inc.

Nevertheless, a need exists for a connector to join vent pipe sections of various types that provides a secure and easy to assemble connection.

SUMMARY OF THE TECHNOLOGY

The present technology, roughly described, pertains to an interlocking mechanism suitable for use with exhaust components. The mechanism may be provided on pipes, components, adapters or appliances. In one embodiment, the technology includes an entry channel and a rotational channel positioned adjacent to entry channel. A locking bead is positioned in the rotational channel at a position in the channel defined to engage a notch in a locking lug on a mating component when the lug is positioned adjacent to an end of the channel.

In a further aspect, the entry channel may include an entry portion adjacent to an edge of the component and an end portion. The entry channel may include a face increasing in height from the entry portion to the end portion. In another aspect, the face has a first side and a second side, and the height on the first side being greater than the height on the second side.

In a further aspect, a locking channel formed in an exhaust system component is provided. The locking channel includes an entry channel; and a rotational channel. The rotational channel is positioned adjacent to an entry channel to receive a locking element. The rotational channel includes a locking bead at a position defined to engage a mating component on the locking element, thereby securing the exhaust system component and the mating component.

In another aspect, an exhaust system component including a portion of a locking structure is provided. A portion of the locking structure includes a locking lug formed in the component, the lug including a notch positioned to engage a corresponding mating element on a mating exhaust system component.

In another aspect, the technology is a locking channel formed in an exhaust pipe. The locking channel includes an entry channel receiving a locking lug on a second exhaust pipe and a rotational channel. The rotational channel is joined with the entry channel and has a cross section designed to receive the locking lug. The rotational channel includes a locking element positioned in the rotational channel at a position to engage a mating component on the locking lug, thereby securing the exhaust system component and the mating component.

In another aspect, a locking channel formed in an exhaust component is provided. The locking channel includes an entry channel receiving a locking lug, the entry channel having an entry portion adjacent to an edge of the component and an end portion. The entry channel includes a surface having a sloped face increasing in height from the entry portion to the end portion.

These and other objects and advantages of the present technology will appear more clearly from the following description in which the preferred embodiment of the technology has been set forth in conjunction with the drawings.

BRIEF DESCRIPTION OF THE DRAWINGS

FIG. 7A is an enlarged view of the female end of a pipe section depicting additional features of the first embodiment of the interlocking mechanism of the present technology.

FIGS. 7B, 7C and 7D are cross sections along lines 7B-7B, 7C-7C and 7D-7D in FIG. 7A.

FIG. 10A is a perspective view illustrating a third embodiment of the interlocking mechanism of the present technology.

FIG. 10B is a cross section along the line B-B in FIG. 10A.

FIG. 10C is a cross section along the line C-C in FIG. 10A.

FIG. 12A is a depiction of a fifth embodiment of the interlocking mechanism of the present technology.

FIG. 12B is a cross section along the line B-B in FIG. 12A.

FIG. 12C is a cross section along the line C-C in FIG. 12A.

DETAILED DESCRIPTION

An interlocking mechanism for a vent pipe or other ductile pipe is disclosed herein. The interlocking mechanism may be used with single wall pipe, double wall pipe, or any interlocking components of an exhaust system, including coupling adapters for appliances, or components attached directly to the appliance itself. The interlocking mechanism is described in accordance with a "male" end and a "female" end, and each type of end may be used interchangeably. That is, while the present disclosure details a male end and a female end on a single pipe, it will be understood that either the male end or female end may be used alone on a pipe, fitting, adapter or appliance. In other variants, two male ends or two female ends may be used on a pipe section. The type of pipe, or the use of the interlocking mechanism with respect to individual appliances or other fittings, is not limiting with respect to the interlocking mechanism features disclosed herein.

Figure 1:
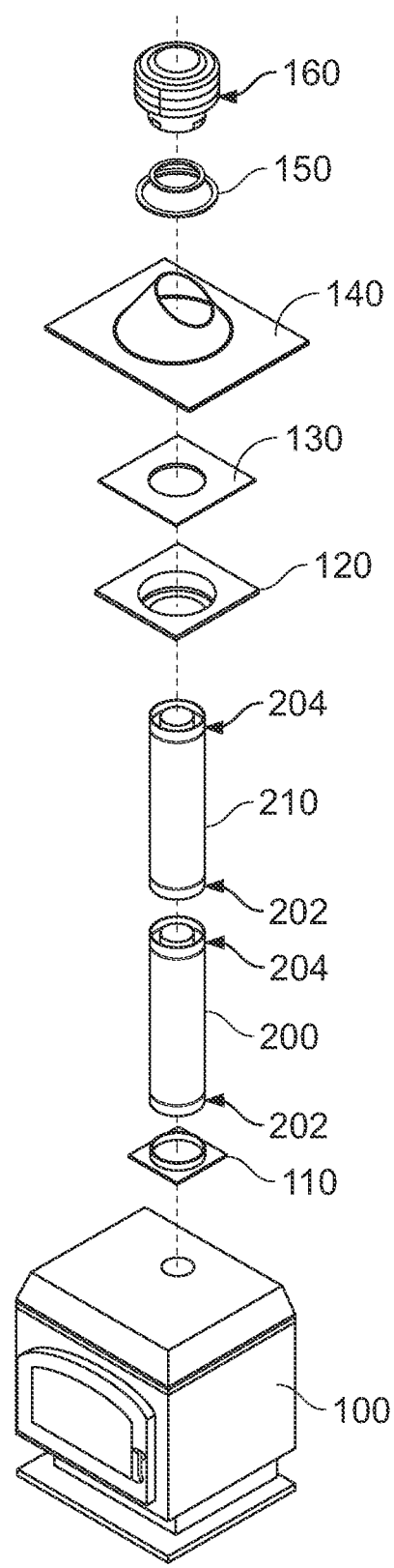
FIG. 1 is a perspective view of an exemplary implementation utilizing the interlocking mechanism of the present technology.

FIG. 1 shows a perspective view of one possible use of an exhaust system incorporating the interlocking mechanism. FIG. 1 shows an exemplary appliance 100, which may be a gas appliance, wood burning appliance or other type of exhausting appliance which is connected to an exhaust system. The exhaust system comprises pipe sections 200, 210, a storm collar 150 and a vertical termination 160. Pipe section 200 is coupled to the appliance 100 by an appliance adapter 110. Sections 200 and 210 extend the exhaust system through a section of the roof of a building 120, and possibly through other exemplary structural elements including a ceiling fire stop 130, and flashing 140. The interlocking mechanism of the present technology may be utilized to couple the pipe sections 200, 210 to each other, to the appliance adapter 110 or the appliance 100 itself, to the vertical termination 160, and the like. Note that the pipe sections shown in FIG. 1 may be of the type commonly referred to as "direct" vent pipes, for venting direct vent hearth appliance or double wall vent pipe for gas appliances. Or venting systems for natural gas or propane type appliances. Such pipes are sold under the trademarks Simpson Dura-Vent Type B and DirectVent GS®.

Figure 2A:
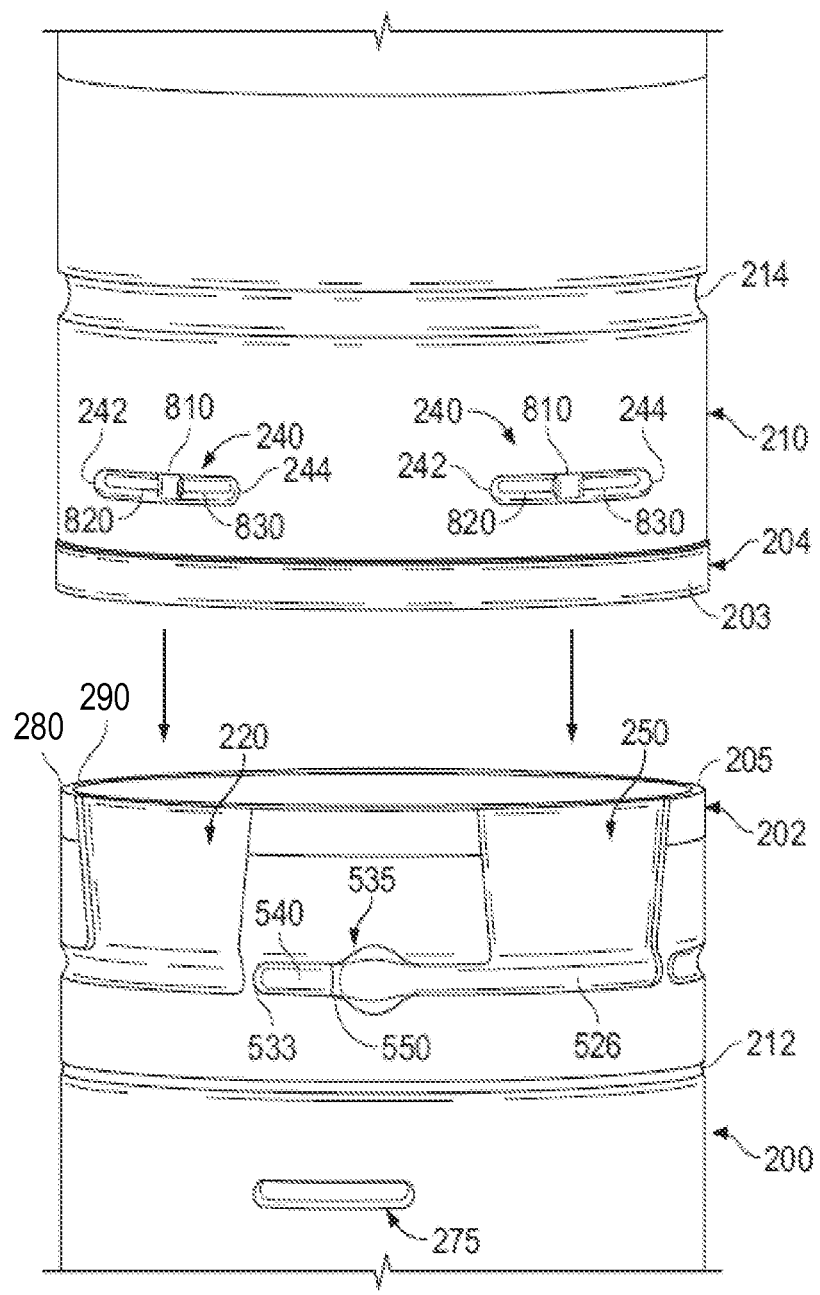
FIGS. 2A-2C show an assembly process utilizing the interlocking mechanism in accordance with the first embodiment of the present technology.
Figure 2B:
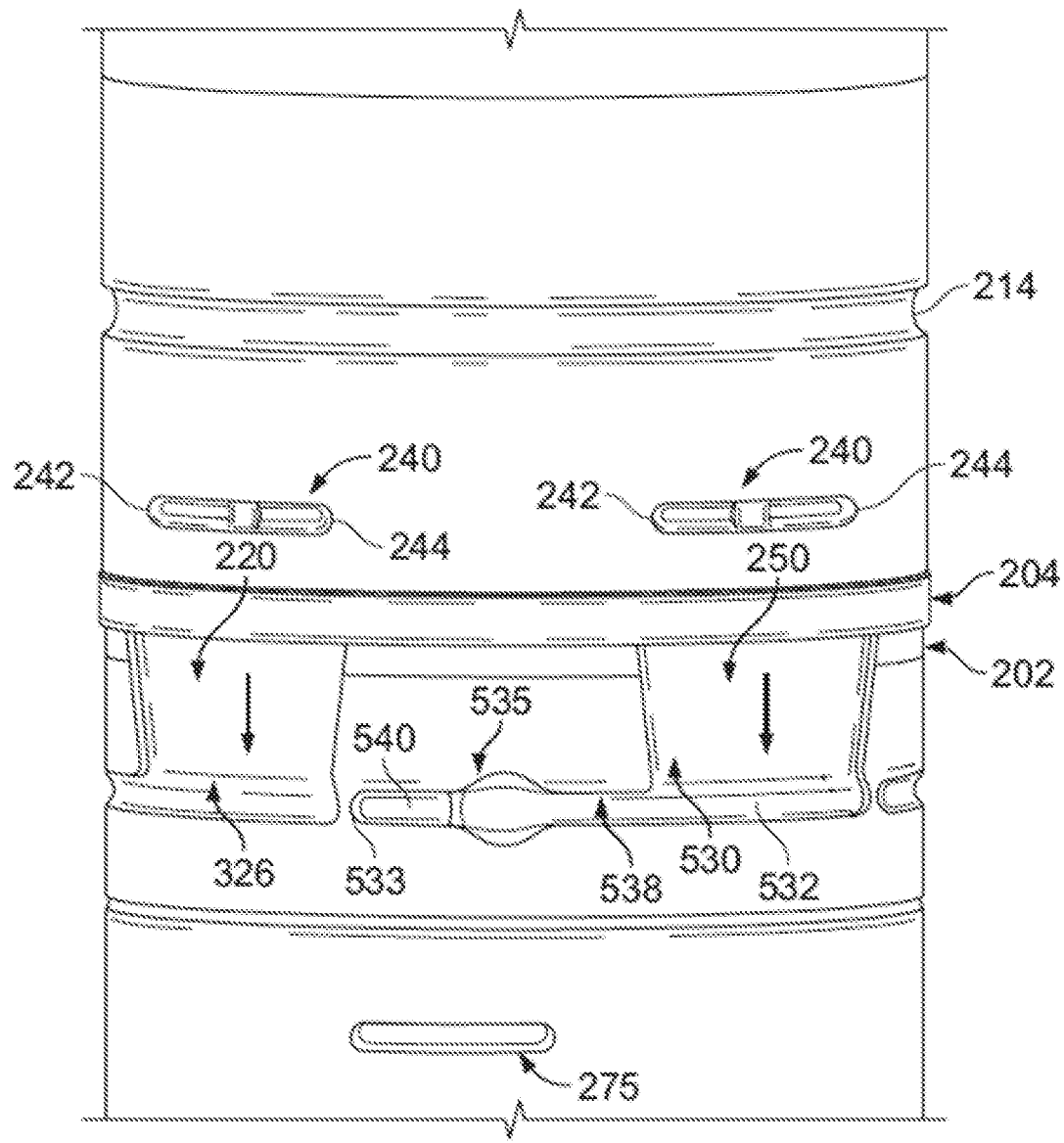
Figure 2C:
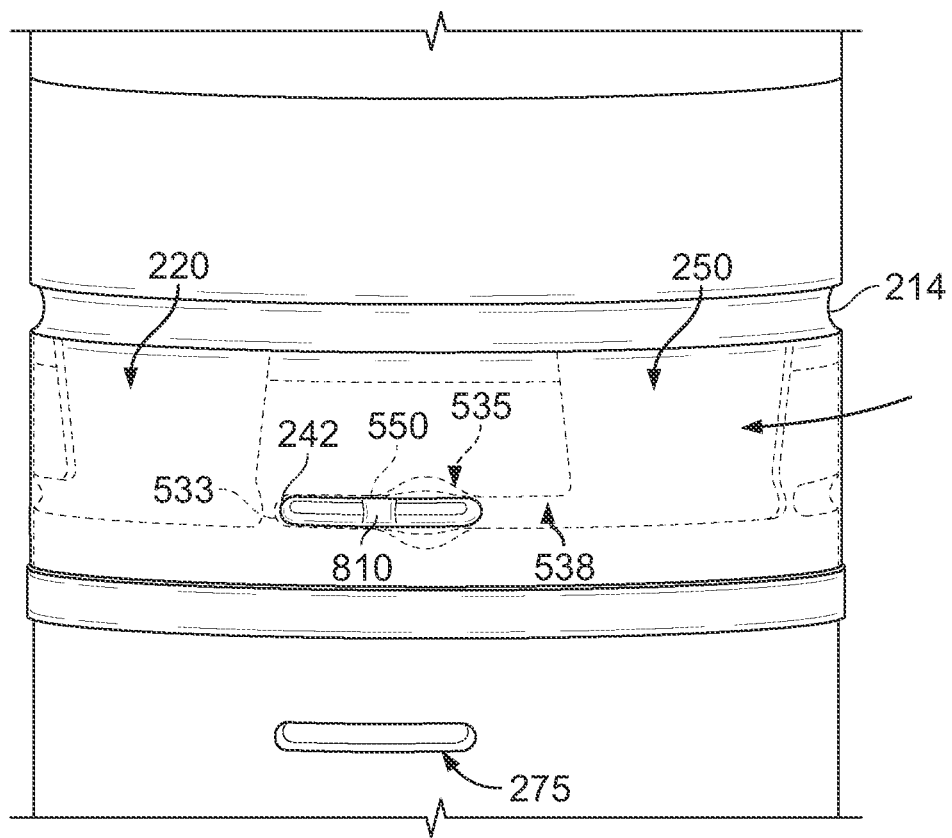

FIGS. 2A-2C illustrates a first embodiment of an interlocking mechanism in accordance with the present technology. FIGS. 2A-2C are perspective views of a first end 202 or "male" section of a pipe section 200 mating with a second or female end 204 of a pipe section 210. Details of the locking channels 220, 250 and the locking lugs 240 are described below with respect to FIGS. 3-6 and 7-8 respectively.

FIGS. 2A-2C generally shows how the interlocking mechanism functions in a bayonet mount fashion. As will be generally understood, a bayonet mount is a coupling mechanism designed to quickly lock two reciprocating ends of a reciprocating connection, and is typically accomplished by engaging the respective ends and twisting the couplings with respect to each other by a quarter turn or less of the components.

Each exemplary pipe section 200, 210 includes both a male end 202 and a female end 204. In FIG. 2A, only the male end 202 of pipe coupling 200 and the female end 204 of pipe section 210 are illustrated. The female end 204 of the interlocking mechanism includes locking lugs 240, each comprising a generally oblong shaped and recessed portion (relative to the page of the Fig.) indented with respect to an exterior surface of the tube 210. Each lug includes a locking notch 810 separated by first and second deeper indented regions 820, 830, respectively, and a first curved edge 242 and a second curved edge 244. Details of each locking lug are illustrated with respect to FIGS. 7A-7D and are explained below. Optionally, four locking lugs are provided on each pipe section 200, 210, but more or fewer lugs may be used.

Each male end 202 of pipe section 200 includes circumferentially spaced locking channels 220 and 250 disposed about the diameter of the pipe section 200. In one embodiment, four locking channels are utilized: two of locking channels 220, spaced 180° apart, and two of locking channels 250, spaced 180° apart. In one embodiment of the present technology, locking channels 220 and 250 have different structures, as illustrated below. The locking channels are designed to mate with the locking lugs 240 such that when the male end 202 including the channels 220, 250 engages the female end 204 with lugs 240, each lug 240 slides into the channel as the sections are brought together until the movement of the sections toward each other is prevented by the shape of the channel. Subsequently, the sections 200 and 210 are rotated (clockwise) with respect to each other until mating of the interlocking mechanism is complete, as indicated by audible and visual feedback provided by the interlocking mechanism as discussed below.

With reference to FIG. 2A, with locking lugs 240 positioned over the entrance to the locking channels 220, 250, the respective pipe sections 200 and 210 are moved toward each other in relative motion until such motion is prevented by the structure of the channel. As discussed below, this is primarily due to edges 329 and 529 of channels 220 and 250, respectively.

As illustrated in FIG. 2B, pipe section 210 has been positioned at a point where the edge 203 of pipe section 210 is adjacent to the end edge 205 of pipe section 200 and locking lugs 240 are aligned with channels 220 and 250 respectively. It will be understood that two additional locking lugs 240 may be aligned with two other locking channels out of view in FIG. 2B. The pipe sections are then brought together so that the locking lugs 240 enter the locking channels 220, 250 and are guided therein by the relatively trapezoidal shape of an entrance region of locking channels 220 and 250.

The pipe sections are then rotated relative to each other as shown in FIG. 2C so that the locking notch 810 of the locking lug 240 engages a locking bead 550 in rotational channel 538, and edge 242 of locking lugs 240 engages end 333 and end 537 of each respective rotational channel 220, 250 in pipe section 200.

Details of the particular structures used in the interlocking mechanism of the present technology advantageous with respect to prior embodiments will be discussed with respect to FIGS. 3-8.

Figure 3:
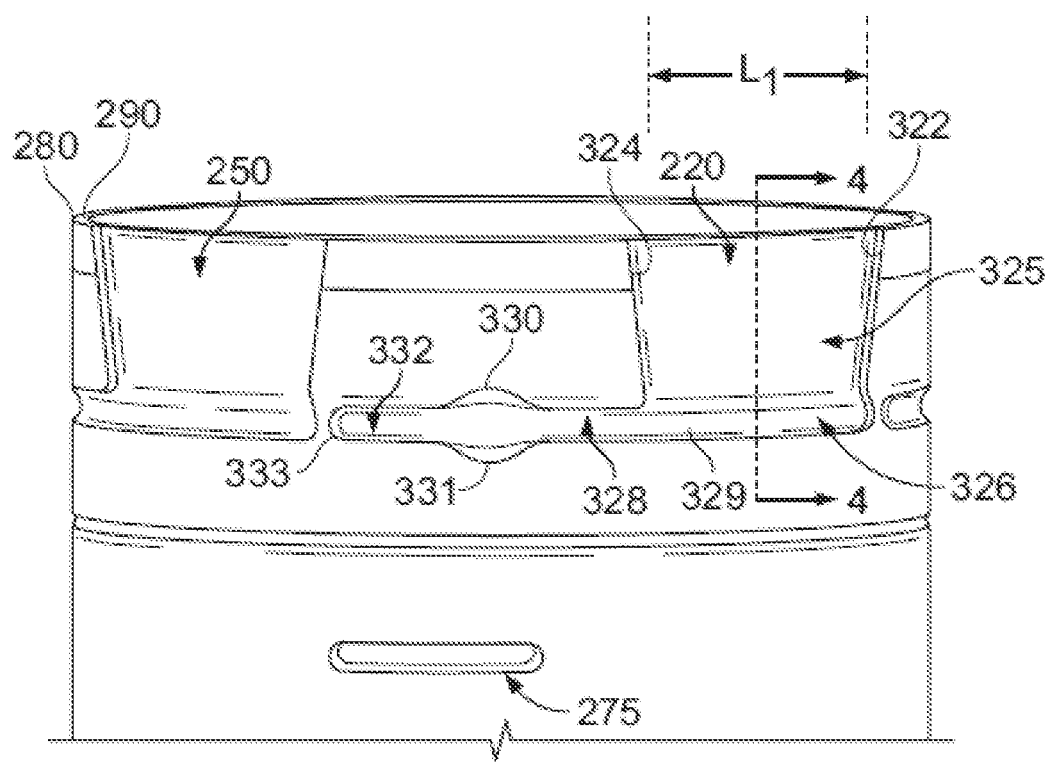
FIG. 3 is a perspective view of a first portion of a first embodiment of an interlocking mechanism in accordance with the present technology.
Figure 4:
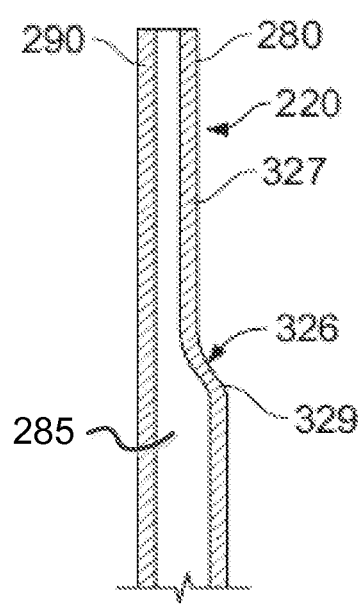
FIG. 4 is a cross section along line 4-4 in FIG. 3.

FIGS. 3 and 4 illustrate the structure of a first locking channel 220. Note that pipe section 200 of FIG. 3 is rotated 90 degrees with respect to FIGS. 2A-2C. FIG. 3 is a bottom perspective view of the male end of a pipe section, and FIG. 4 is a cross section along line 4-4 in FIG. 3. In one embodiment, each pipe section is formed of rolled, stainless steel, aluminum, or other suitable material. The stainless steel may have a thickness of approximately 0.018 inch nominal for the outer wall and 0.012 inch nominal for the inner wall. The features of the locking channels 220, 250 and locking lugs 240 are formed into the respective pipe sections 200, 210 by deforming a wall 280 of the pipe section using a press mold or stamping the structural features set forth below into the stainless steel. In a two wall pipe structure, an inner wall 290 and outer wall 280 are included. In a double wall pipe, the locking lugs and locking channel are formed in the outer wall 280; inner wall 290 is not affected by the formation of the locking channels 220, 250 or lugs 240.

Locking channel 220 includes an entrance channel 325 defined by tapered edges 322 and 324, and base edge 329. Tapered edges 322 and 324 provide a generally trapezoidal shaped entry region, wider near edge 205 than near rotational channel 328, making it easier to align the locking lugs 240 in the locking channel. In one embodiment, the length (L1) of the opening between the edges 322 and 324 at a point just above channel 328 is slightly greater than the length (L2, FIG. 7A) of lugs 240 between edges 242 and 244. However, the lugs may be any length narrower in width that this opening. Entrance channel 325 terminates in a rotational channel 328 having a first region 326 at the base of the entrance channel 325, and an end region 332 adjacent to end wall 333 of channel 328. Rotational channel 328 includes a non-functional crimp formed by walls 330, 331 which results from the formation process.

As illustrated in FIG. 4, entrance channel 325 includes a recessed surface 327 ending at base edge 329. This allows a locking lug 240 to pass down toward edge 329 and region 326 of rotational channel 328 with little resistance from the male end of the pipe section. The base edge 329 of entrance channel 325 stops the progress of the locking lug 240 when the lug enters the locking structure 220. Once the locking lug 240 reaches the bottom edge 329 of entrance channel 325, the pipe sections are rotated clockwise with respect to each other and the locking lug 240 travels along rotational channel 328 until the end 242 of locking lug 240 engages the end 333 of channel 328. Region 332 denotes a section of channel 328 when the locking lug 240 has its edge 242 adjacent to the end 333 of channel 328. At this point, locking lug 240 will align with an alignment marker 275 providing visual feedback to the installer. The alignment marker is provided to allow an installer to visually align both the locking lug 240 with the alignment marker 275 indicating that the items are fully locked together. Rotational channel 328 has a semi-circular cross-section generally matching the semi-circular cross-section of the locking lug 240.

As noted above, the present technology is not limited by the kind of pipe on which the interlocking mechanism fastener is used. For illustration purposes only, one typical vent pipe is shown in cross-section in FIG. 4. Shown therein is a cross-section of a double-wall vent pipe having an inner wall 290 and an outer wall 280. An annular space 285 is formed between the inner and outer walls 290, 280. The inner wall 290 of the vent pipe is supported concentrically by a spacer inside the outer wall 280. In one embodiment, an annular ring 214 is formed in outer wall 280 such that the inner wall 290 may be attached thereto. A similar but smaller annular ring 212 may be formed in section 200. In additional embodiments, the annular space may include an insulation material. Typically both the inner and outer walls are made of a ductile material; sometimes, the inner and outer walls will be made of the same material, while in other cases, the inner wall may be made of different materials, for example, the inner wall may be made of aluminum while the outer wall is made of steel.

Figure 5A:
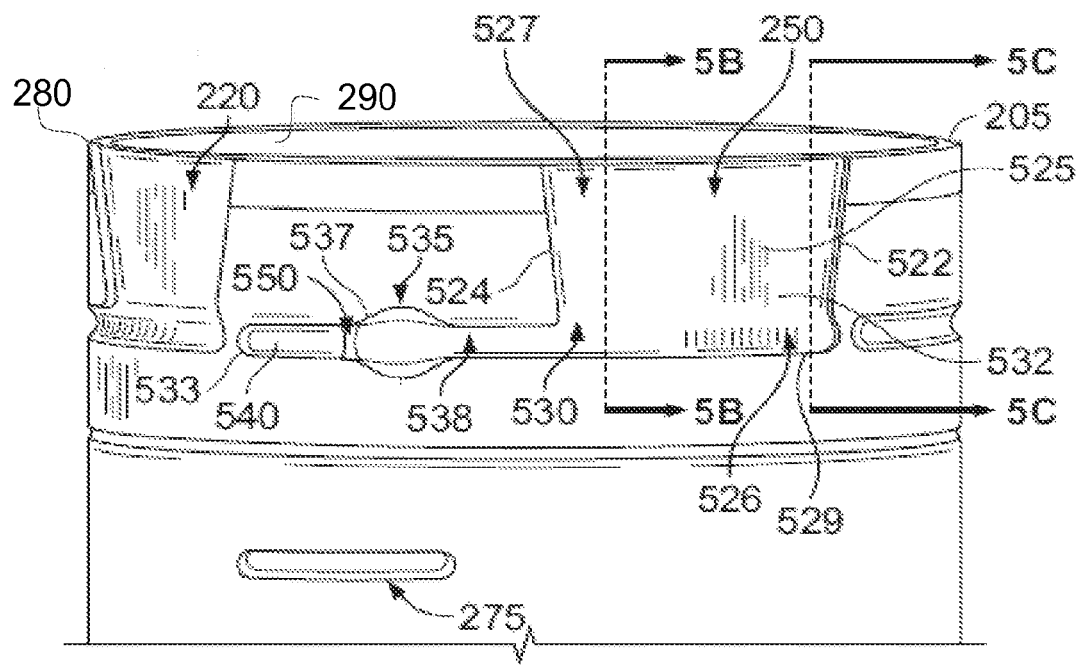
FIG. 5A is a perspective view of a second portion of the first embodiment of the interlocking mechanism of the present technology.
Figures 5B, 5C:
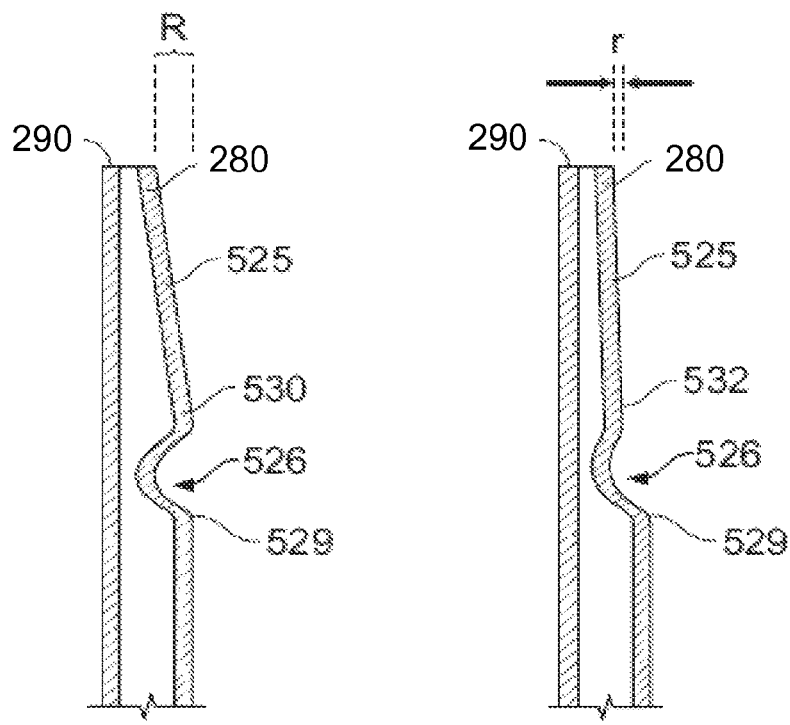
FIGS. 5B and 5C are cross sections along lines 5B-5B and 5C-5C, respectively, in FIG. 5A.
Figure 6A:
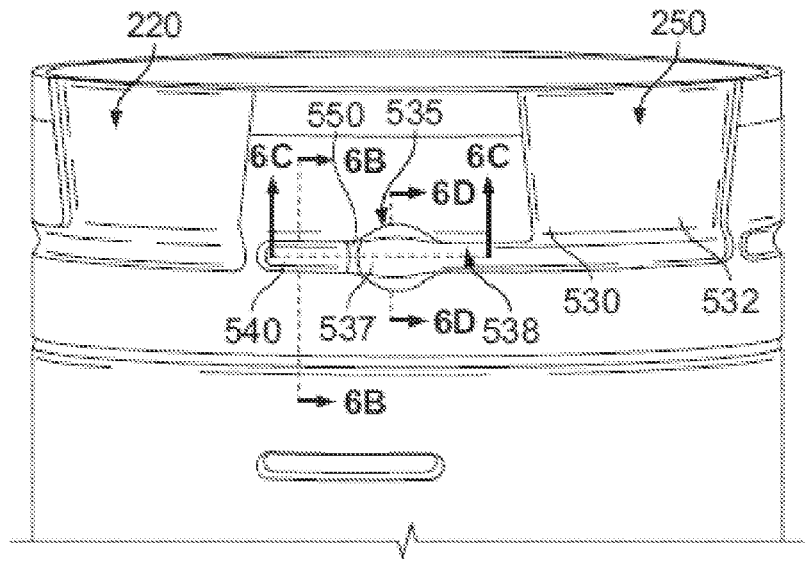
FIG. 6A is a depiction of additional components of the second portion of the first embodiment of the interlocking mechanism of the present technology.
Figure 6B:
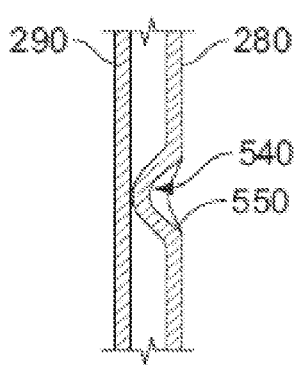
FIGS. 6B, 6C and 6D are cross sections along lines 6B-6B, 6C-6C and 6D-6D in FIG. 6A.
Figure 6C:
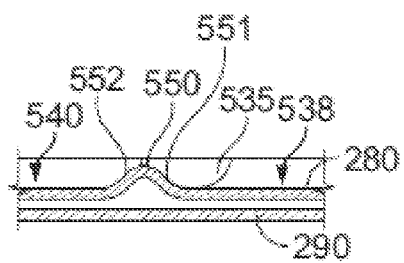
Figure 6D:
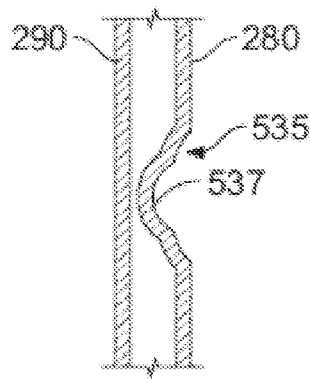

FIGS. 5A-5C illustrate the details of locking channel 250. FIG. 5A is a bottom perspective view of the male end of a pipe section, and FIGS. 5B-5C are cross sections along lines 5B-5B, and 5C-5C in FIG. 5A. Unlike locking channel 220, locking channel 250 is designed to provide frictional resistance to the locking lugs 240 as they enter the channel, and an audible click once the lug enters a rotational channel 538.

Entrance channel 527 is defined by a first tapered edge 522, a second tapered edge 524, and a bottom edge 529, all formed into the male end 202. Edges 522 and 524 are tapered to provide a roughly trapezoidal shape so that the top or entry portion of the entrance channel 527 (adjacent to edge 205) is wider than a lower portion (adjacent to channel 538, at regions 530 and 532) to allow the locking lug 240 to be guided therein. Entrance channel 527 terminates in a rotational channel 538 having a first region 526 at the base of the entrance channel 527, and an end region 540 adjacent to end wall 533 of channel 538. Rotational channel 538 includes a crimp 535 and a locking bead 550. Crimp 535 is a result of formation of the channel and serves no functional purpose in the locking mechanism but includes a bottom channel region 537. Rotational channel 538 has a semi-circular cross-section generally matching the semi-circular cross-section of the locking lug 240. Entrance channel 527 of locking channel 250 has a sloped surface 525 relative to pipe inner wall 290, which increases the frictional force on the locking lug 240 as it is inserted into the entrance channel 527 of locking channel 250. In one embodiment, sloped surface 525 has a different slope between edge 205 of pipe section 200 and region 530, and edge 205 and region 532 as illustrated in FIGS. 5B and 5C.

As a locking lug engages the surface 525, the frictional force on the locking lug will increase due to the slope of the surface 525.

As illustrated in FIGS. 5B and 5C, a first side of surface 525 ends at a region 530 which has a slope which is greater than a second region 532. In general, region 530 is positioned closer to the rotational channel 538 such that when the locking lug 240 is pushed down toward the rotational channel region 526, an audible snap will occur as the locking lug 240 passes over the regions 530, 532 and into channel 538 to engage the bottom edge 529 at channel region 526.

The slope of regions 530 and 532 may vary in accordance with the size of the pipe and the length of the channel. In one embodiment, the slopes may be equal. In an embodiment where they are formed with varying slopes, for a pipe having a 6⅝ inch diameter, with the entry point of the channel being equal, the difference in height between the ends of regions is about 0.060 inch, with region 532 having a rise height (r) of 0.030 inch and region 530 a rise height (R) of 0.090 inch. Given different diameters of the pipe, the regions will have varying dimensions.

Also provided in the rotational channel 538 is a locking bead 550. The bead 550 is formed by a crimp in the channel. Locking channel 538 includes a first region 526 adjacent to the entrance channel 527 and a second region 540 which is designed to receive the first end 242 of a locking lug 240. Locking bead 550 comprises a raised portion in channel 538, detailed in FIGS. 6A-6D, which engages the locking notch 810 on a locking lug 240. Again, an alignment marker 275 is provided to allow the installer to recognize when a locking lug 240 has fully engaged the end 533 of the locking channel 538. As the locking lug 240 engages the entrance channel 527, and is slid clockwise into the receiving channel 538, the notch 810 engages locking bead 550 and region 820 of each locking lug engages region 540 of channel 538. It will be appreciated that while the locking lug includes a notch 810 designed to mate with the bead 550, any structure on an exhaust system component including an element equivalent to notch 810 may be substituted for notch 810 and lug 240. Equivalents include a shorter lug not having a notch (such as those described in the alternative embodiments discussed below) designed to pass over the bead 550 and enter region 540, or alternative multiple lug formations designed to mate with bead 550. Alternative configurations of the locking bead 550 are also within the scope of the present technology. Equivalents may include any structure provided in the channel or coincident with the channel which is designed to couple with a mating element or structure such as a notch, groove, dimple, etc. on a mating exhaust component.

In the embodiment discussed above, locking channels 220 and 250 are combined with rotational channels 328 and 538, respectively. It should be recognized that alternative combinations of the locking channels and the rotational channels may be utilized in accordance with the present technology. For example, in one embodiment, four locking channels are used per pipe end—two locking channels 220 combined with two rotational channels 328 and two locking channels 250 combined with two rotational channels 538. In another alternative, four locking channels are used per pipe end with one of locking channels 220 being combined with rotational channel 328 and three of locking channels 250 being combined with three rotational channels 538. In another alternative, four locking channels are used per pipe end—two locking channels 220 are combined with two rotational channels 328 and two locking channels 250 are combined with two rotational channels 538. In another alternative, all four locking channels may incorporate rotational channels 538 with locking beads 550. More or fewer than four locking channels may be used per pipe end, with the angular length of the entrance channels and the rotational channels being adjusted to be shorter when more channels are used. It should be further noted that the arc length of each rotational channel need not be equal to the number of locking channels divided by 360°, so that the rotational channels may be shorter than that shown in the figures discussed herein.

In alternative embodiments, four of locking structures 250 may be provided or only two or one of such structures may be provided. In another embodiment, three locking channels, two locking channels or only one locking channel may be provided.

FIG. 6A-6D illustrate various aspects of the locking bead 550 and rotational channel 538. Each channel 538 has a depth formed by the recession of outer wall 280 in the channel 538. The depth is sufficient to accommodate the height of the locking lug 240 in the channel with minimal clearance therein. The locking bead 550 is designed to engage the locking notch 810 in the locking lug 240 after a first portion 820 of the locking lug passes over the bead. A first portion 820 of the locking lug 240 rests in region 540 of the locking channel and a second portion 830 rests in a region of locking channel 538. Bead 550 has sloped sides allowing the semi-spherical shaped portion of region 820 formed at edge 242 of locking lug 240 to ride over the bead 550. In one embodiment, the angle of side 551 of locking bead 550 is shallower than that of side 552, allowing the edge 242 to ride over the bead more easily, while more securely engaging the locking notch 810.

Figure 7D:
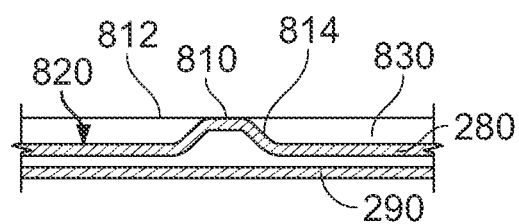
Figure 8:
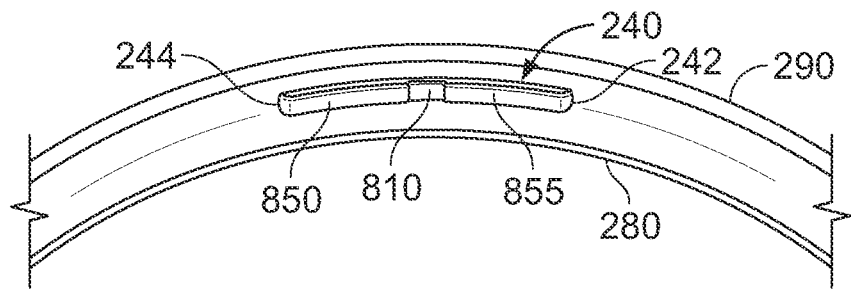
FIG. 8 is a bottom, perspective view of the female end depicted in FIG. 7A.

FIGS. 7A-7D and 8 illustrate particular aspects of the locking lug 240. FIG. 7A is a bottom exterior perspective view of the female end of a pipe section 210, and FIGS. 7B-7D are cross sections along lines 7B-7B, 7C-7C and 7D-7D in FIG. 7A. FIG. 8 is a bottom view of the female end of pipe section 210. FIG. 8 illustrates the locking lug 240 and the back portions 850, 855 of regions 820, 830, respectively, which engage the respective regions 540 of the locking channels 538.

As illustrated therein, the locking lug 240 is defined by a first region 820 and a second region 830 defined by circular ends 242 and 244. Ends 242 and 244 have a radius which approximately matches the ends 333, 533 of each of the rotational channels 538. Locking lug 240 is created by an indentation in the outer wall 280 of the female end 204 of a pipe structure. Lugs 240 have a length L2, width W and a height H defined by the indentation. Locking notch 810 has a first side 812 and a second side 814 which separates the recessed regions 820 and 830. As illustrated in FIG. 7D, region 810 has a height approximately equal to the diameter of the outer wall 280 of the pipe section. Sides 812, 814 which are sloped to provide resistance to movement of the locking bead 550 when the locking bead is engaged with notch 810, but sufficient to allow the locking bead 550 to disengage notch 810 when sufficient force is applied by an installer seeking to disassemble the interlocking mechanism. Regions 820 and 830 have semi-spherically shaped ends adjacent to edges 242, 244, formed by the indentation of the outer wall 280 and the semicircular cross section of the locking lug as illustrated in FIGS. 7B and 7C. Locking lugs 240 have a semi-circular cross-section illustrated in FIG. 7B, generally matching the semi-circular cross-section of the rotational channels 328 and 538.

It will be recognized that while the technology has been described with respect to a "male" end of the pipe and a "female" end of the pipe section, the configuration of the interlocking mechanism may be reversed such that the locking lugs 240 are formed on a "male" end and the locking channels 220, 250 formed on a "female" end of a pipe, adapter, or appliance.

Figure 9A:
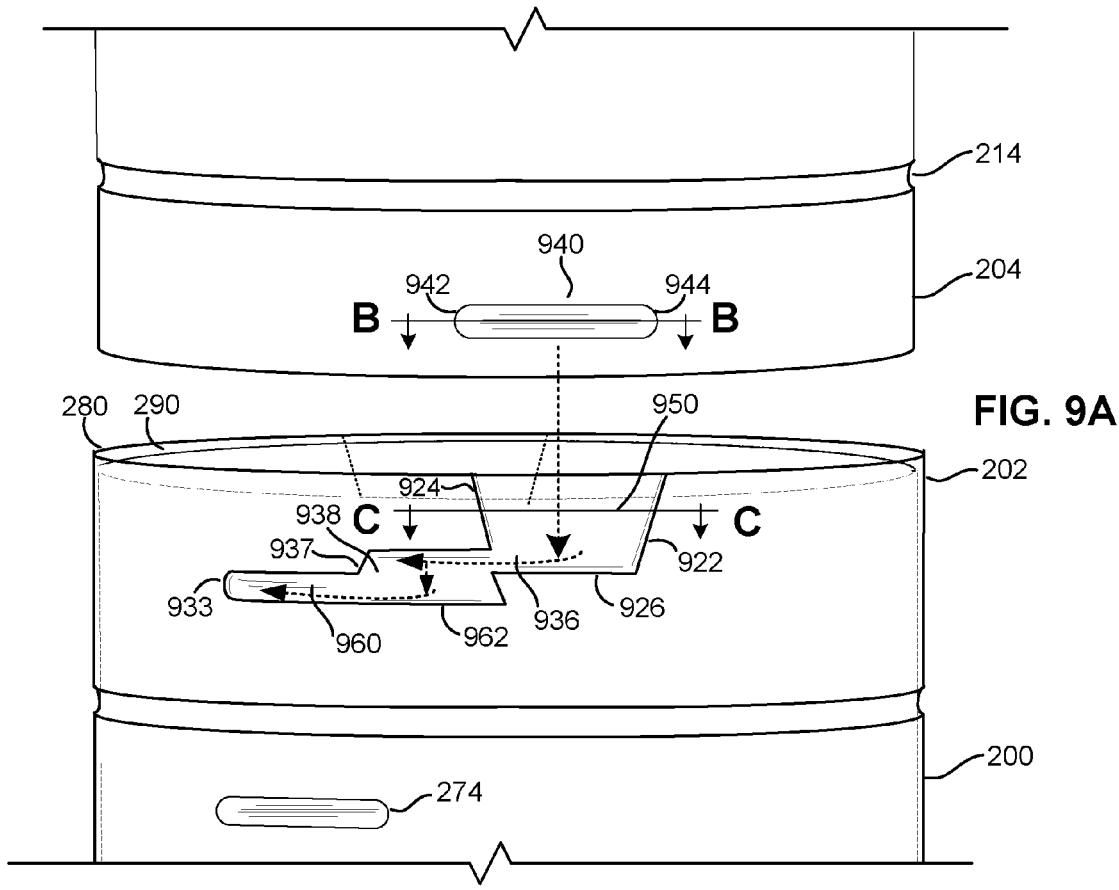
FIG. 9A is a perspective view illustrating a second embodiment of the interlocking mechanism in accordance with the present technology.
Figure 9B:
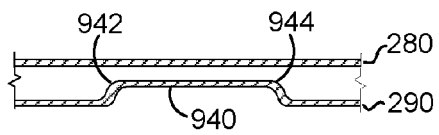
FIGS. 9B and 9C are cross sections along lines B-B, and C-C of FIG. 9A.
Figure 9C:
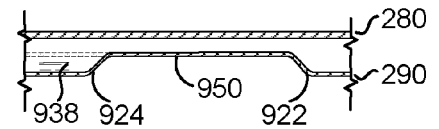

FIGS. 9A-9C illustrate another alternative embodiment of an interlocking mechanism in accordance with the present technology. FIG. 9A is a bottom perspective view of the female end of a pipe section, and FIGS. 9B-9C are cross sections along lines B-B, and C-C in FIG. 9A. In FIG. 9A, only one locking lug 940 and locking structure 950 are shown. It will be recognized that two or more locking structures and corresponding locking lugs 940 may used. In one embodiment, four locking lugs 940 and four locking structures 950 are used. As illustrated in FIG. 9A, the male end of the locking structure includes a locking receptacle 950 having an entrance channel 936 defined by walls 922 and 924 which are tapered in a manner similar to previous embodiments to allow locking lug 940 to enter the channel 936 until it is halted from motion by edge 926 of the entrance channel 936. Subsequently, the pipes are rotated so that locking bead 940 moves clockwise relative to pipe section 200 and locking lug 940 enters a channel region 938, clear of edge 926. The rotation is impeded by an edge 937 of locking channel 950. Relative motion of the pipes toward each other is no longer impeded, and this allows lug 940 to drop vertically to a lower edge 962 of second channel 960. The pipes are rotated again so that locking bead 940 moves clockwise relative to pipe section 200, driving locking lug 940 into the locking channel 960 and against wall 933. It should be recognized that while the embodiment shown in FIGS. 9A-9C does not include a locking lug 550 and notch 810 similar to that provided in the previous embodiments, such features may be added to channel 960 and the locking lug 940 in an contemplated variant of this embodiment of the present technology.

FIGS. 10A-10C illustrate yet another alternative embodiment of the present technology. In this embodiment, the locking lug 940 is equivalent to that shown in FIG. 9A. FIG. 10A is an exterior perspective view of the male end of a pipe section, and FIGS. 10B-10C are cross sections along lines B-B, and C-C in FIG. 10A. The locking channel 1050 includes an entry channel 1036 defined by tapered walls 1022 and 1024. Downward motion of the locking lug 940 is impeded by the bottom wall 1026 of the entry channel 1036. Subsequently, clockwise rotation of the female end relative to the male end results in the locking lug 940 passing over a locking hump region 1055 and into channel 1038. As detailed in FIG. 10B, locking hump 1055 includes a tapered first wall 1052 and a relatively vertical rear wall 1056. This allows the locking hump to more easily ascend ramp 1052 and be locked in place by ramp 1056 when the locking lug 940 enters rotational channel 1060. In one embodiment, channel 1060 has a length greater than the length between ends 942 and 944. As noted above, the locking channel 1060 does not include a region 810, but the notch 810 and bead 550 shown in FIGS. 2A-8 can be incorporated into this embodiment as well.

Figure 11A:
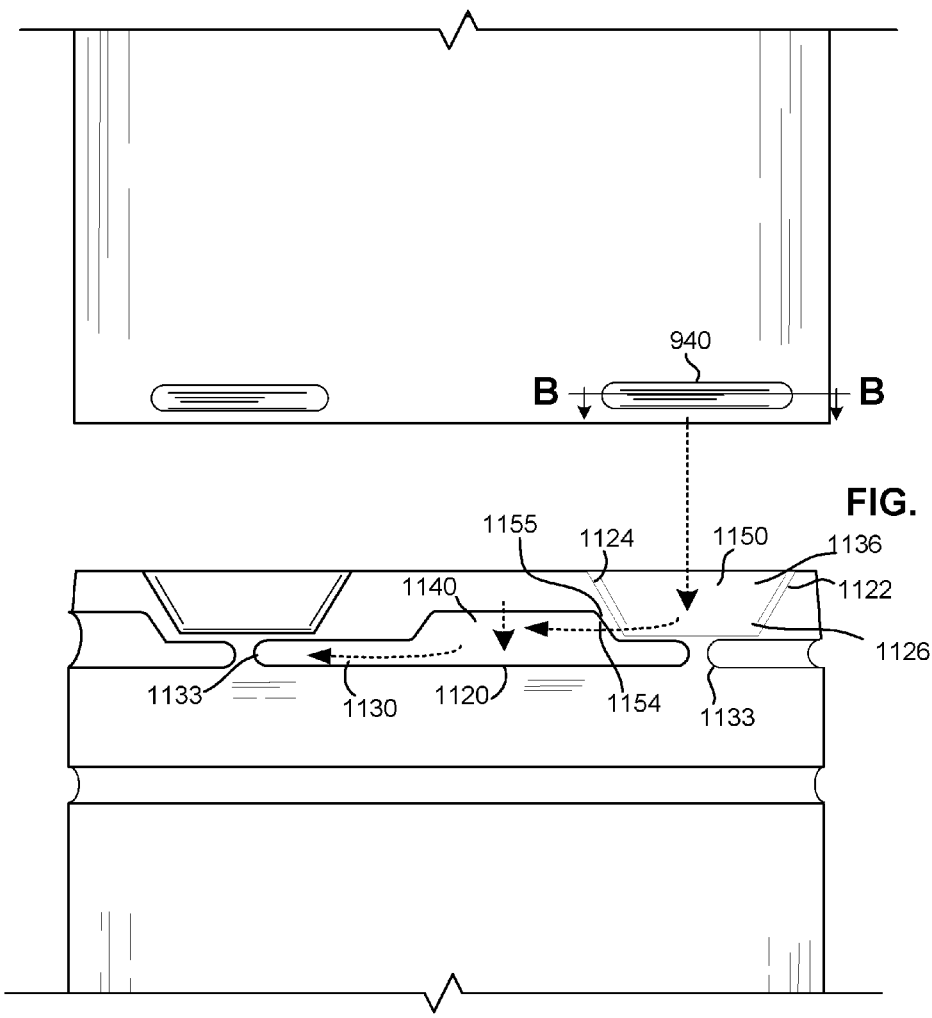
FIG. 11A is a perspective view illustrating a fourth embodiment of the interlocking mechanism of the present technology.
Figure 11B:
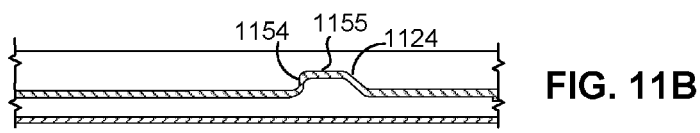
FIG. 11B is a cross section along the line B-B in FIG. 11A.

FIGS. 11A-11B show yet another alternative embodiment of the present technology. FIG. 11A is a bottom exterior perspective view of the male end of a pipe section, and FIG. 11B is cross sections along lines B-B in FIG. 11A. In FIG. 11A, the locking channel 1150 includes an entry region defined by tapered walls 1122 and 1124 which define into an entry channel 1136. Downward motion of the locking lug 940 is impeded by the bottom edge 1126 of the entry channel 1136. Subsequently, clockwise rotation of the female end relative to the male end results in a locking lug 1120 traversing a ramp 1124 entering into locking channel 1140. Channel 1140 includes a lower edge 1120 which is spaced apart from the locking channel and allows further motion of pipe section 200 relative to pipe section 210. Locking lug 1120 has a spherical shape which matches the spherical shape of locking depression 1140. Additional downward motion in channel 1140 is impeded by bottom edge 1120, and clockwise rotation of the female end relative to the male end results in a locking lug 1120 entering rotational channel 1130. As noted above, the locking channel 1130 does not include a region 810, but the notch 810 shown in FIGS. 2A-9 can be incorporated into this embodiment as well.

FIGS. 12A-12C illustrate yet another alternative embodiment of the present technology. In this embodiment, the locking lug 1240 has a generally spherical shape which engages a generally spherical locking notch 1220. FIG. 12A is a perspective view of the male and female ends of a pipe section, and FIGS. 10B-10C are cross sections along lines B-B, and C-C in FIG. 10A. In FIG. 11A, the locking channel 1250 includes an entry region defined by tapered walls 1222 and 1224 which define an entry channel 1236. Downward motion of the locking lug 1240 is impeded by the bottom wall 1226 of the entry channel 1236. Subsequently, clockwise rotation of the female end relative to the male end results in a locking lug 1240 traversing a ramp 1230 entering into locking notch 1220. Locking lug 1220 has a spherical shape which matches the spherical shape of locking depression 1240.

Figure 13A:
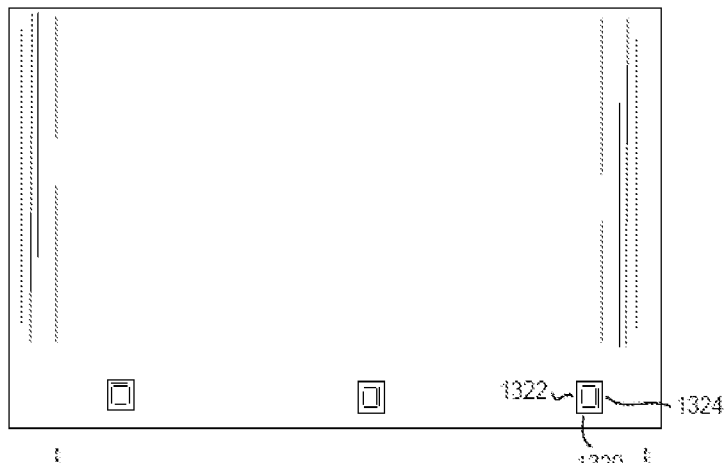
FIG. 13A is a depiction of a sixth embodiment of the interlocking mechanism of the present technology.
Figure 13B:
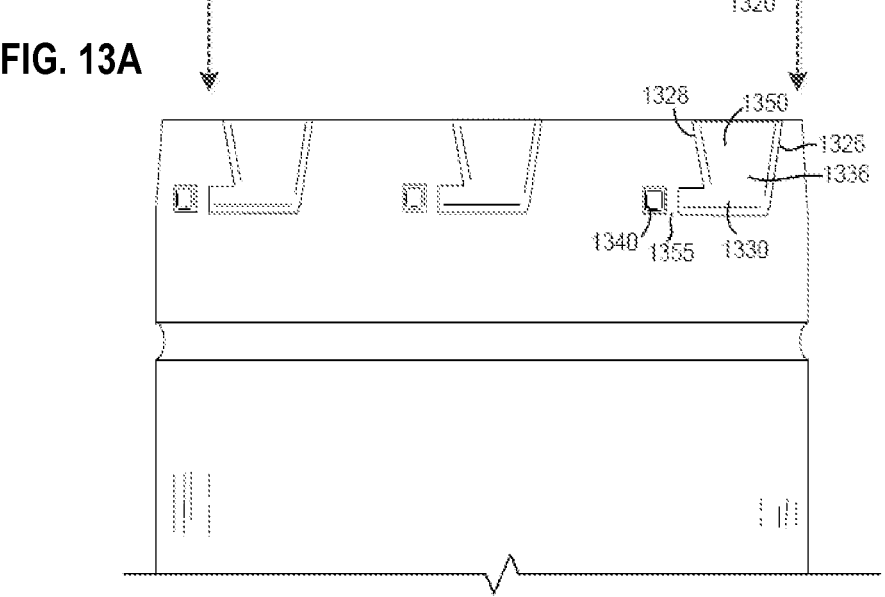
FIG. 13B is a cross section along the line B-B in FIG. 13A.
Figure 13B:
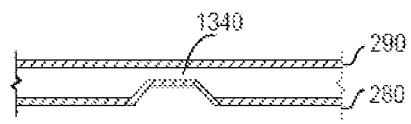

An alternative embodiment is shown in FIG. 13A-B wherein the locking lugs have a square cross section and fit in a square depression 1340. FIG. 13 is a perspective view of the male and female ends of a pipe section. In FIG. 13, the locking channel 1350 includes an entry region defined by tapered walls 1326 and 1328 which define an entry channel 1336. Downward motion of the locking lug 1320 is impeded by the bottom wall 1330 of the entry channel 1336. Subsequently, clockwise rotation of the female end relative to the male end results in a locking lug 1320 traversing a ramp 1355 having a cross section equivalent to ramp 1230 in FIG. 12C and entering into locking notch 1340. Locking lug 1320 has a square shape which matches the square shape of locking depression 1340. The cross sectional shape of element 1340 is trapezoidal, as shown in FIG. 13B.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. An exhaust component assembly including an interlocking mechanism, the assembly comprising:
    a first metal exhaust assembly component having an exterior surface, the exterior surface having formed therein:
    an entry channel;
    a rotational channel positioned adjacent to the entry channel; and
    a locking bead positioned in the rotational channel; and
    a second, mating component including an interior surface and an exterior surface, the interior surface sized to mate with the exterior surface of the first metal exhaust assembly component and having formed therein a locking lug, the locking lug including a notch formed therein;
    wherein the locking bead is positioned in the rotational channel at a position in the rotational channel defined to engage the notch in the locking lug when the first component is mated with the second component and the lug is positioned adjacent to an end of the rotational channel.

2. The assembly of claim 1 wherein the entry channel includes an entry portion adjacent to an edge of the first component and an end portion, the entry channel including a sloped surface increasing in height from the entry portion to the end portion.

3. The assembly of claim 2 wherein the sloped surface has a first region and a second region, each region extending from the entry portion to the end portion of the entry channel, said height on said first region being greater than said height on said second region.

4. The assembly of claim 3 wherein said height on said first region is at least two times greater than said height on said second region.

5. The assembly of claim 2 wherein said rotational channel intersects the end portion of the entry channel.

6. The assembly of claim 1 wherein the entry channel has a trapezoidal shape defined by a first edge and a second edge.

7. The assembly of claim 1 wherein the rotational channel has a semi-circular cross section for receiving a mating cross-sectional shape of the locking lug.

8. The assembly of claim 1 wherein the locking lug has a length, a width and a height, and the notch is provided at an approximate center of the length of the locking lug, along the width of the locking lug.

9. The assembly of claim 1 wherein the locking lug is provided on a female end of an exhaust component and the entry channel is provided on a male component of an exhaust component.

10. The assembly of claim 1 wherein the bead has a first side and a second side, each side having a slope, and wherein the first side has a greater slope than the second side.

11. The assembly of claim 10 wherein the second side is positioned closer to the entry channel in the rotational channel.

12. The interlocking mechanism of claim 1 wherein the exhaust component is an adapter.

13. The interlocking mechanism of claim 1 wherein the exhaust component is a pipe.

14. The interlocking mechanism of claim 13 wherein the pipe is a dual wall pipe.

15. The interlocking mechanism of claim 1 wherein the exhaust component is an appliance.

16. An exhaust assembly including a first component and a second component, the assembly, comprising:
    a first component including a wall, the wall having formed therein:
    an entry channel; and
    the wall further having a rotational channel formed adjacent to the entry channel and positioned to receive a locking element which travels through the entry channel into the rotational channel,
    a second component including a wall having the locking element formed therein, the locking element including a mating component formed therein, the wall of the second component sized to mate with the wall of the first component;
    wherein the rotational channel includes a locking bead in the rotational channel at a position defined to engage the mating component on the locking element when the wall of the first component is positioned in the wall of the second component, thereby securing the first component and the second component.

17. The locking channel of claim 16 wherein the entry channel includes an entry portion adjacent to an edge of the first component and an end portion, the entry channel including a sloped surface increasing in height from the entry portion to the end portion.

18. The locking channel of claim 17 wherein the sloped surface has a first region and a second region, each side region extending from the entry portion to the end portion of the sloped surface, said height on said first region being greater than said height on said second region.

19. The locking channel of claim 16 wherein the locking element is a locking lug having a length, a width and a height, and the mating component is a locking notch provided at an approximate center of a length of the locking lug, along the width of the lug.

20. A double wall exhaust system assembly including a first component and a mating second component, each component including an inner wall and an outer wall, the assembly comprising:
    an entry channel formed in an outer wall on the first component, the outer wall further including a rotational channel formed therein, the rotational channel positioned adjacent to the entry channel and having a locking bead positioned in the rotational channel; and
    a locking lug formed in the inner wall of the second component, the inner wall of the second component mating with the outer wall of the first component such that the locking lug enters the entry channel to reach the rotational channel, the locking lug including a notch formed therein at a position to engage the locking bead in the rotational channel of first component after passing through the entry channel.

21. The assembly of claim 20 wherein the locking lug has an oblong shape and a circumferential cross section.

22. The assembly component of claim 20 wherein the lug has a spherical shape and a circumferential cross section.

23. The assembly component of claim 20 wherein the lug has a square shape and a trapezoidal cross section.

24. The assembly of claim 20 wherein the locking lug has a semi-circular cross section to mate with a cross-sectional shape of the rotational channel on the first component.

25. The assembly of claim 20 wherein the locking lug has a length, a width and a height, and the notch is provided at an approximate center of the length of the lug, along the width of the lug.

26. The assembly of claim 20 wherein the locking lug is provided on a female end of an exhaust component.

27. An apparatus, comprising:
    a first metal cylindrical exhaust pipe including an inner wall and an outer wall, the outer wall including an entry channel formed therein;
    a second exhaust pipe having an inner wall including a locking lug,
    the entry channel receiving the locking lug on the second exhaust pipe;
    a rotational channel joined with the entry channel, the rotational channel having a cross section designed to receive the locking lug, the rotational channel including a locking element positioned in the rotational channel at a position to engage a mating component on the locking lug when the inner wall is engaged with the outer wall, thereby securing the first exhaust pipe and the second exhaust pipe.

28. The apparatus of claim 27 wherein the entry channel includes an entry portion adjacent to an edge of the first exhaust pipe and an end portion, the entry channel including a sloped surface increasing in height from the entry portion to the end portion.

29. The apparatus of claim 28 wherein the sloped surface has a first region and a second region, each side region extending from the entry portion to the end portion of the sloped surface, said height on said first region being greater than said height on said second region.

30. The apparatus of claim 29 wherein said height on said first region is at least two times greater than said height on said second region.

31. The apparatus of claim 29 wherein said rotational channel intersects the end portion.

32. The apparatus of claim 27 wherein the locking lug has a length, a width and a height, and mating component is a locking notch provided at an approximate center of the length of the lug, along the width of the lug.

* * * * *